United States Patent
Xu et al.

(10) Patent No.: US 12,051,262 B2
(45) Date of Patent: Jul. 30, 2024

(54) CLINICAL ACTIVITY RECOGNITION WITH MULTIPLE CAMERAS

(71) Applicants: Sony Group Corporation, Tokyo (JP); Sony Corporation of America, New York, NY (US)

(72) Inventors: Wanxin Xu, San Jose, CA (US); Ko-Kai Albert Huang, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 146 days.

(21) Appl. No.: 17/344,730

(22) Filed: Jun. 10, 2021

(65) Prior Publication Data

US 2022/0398396 A1    Dec. 15, 2022

(51) Int. Cl.
*G06V 40/10* (2022.01)
*G06T 7/73* (2017.01)
*G06V 20/40* (2022.01)
*G06V 20/52* (2022.01)

(52) U.S. Cl.
CPC .............. *G06V 40/103* (2022.01); *G06T 7/73* (2017.01); *G06V 20/46* (2022.01); *G06V 20/52* (2022.01); *G06T 2207/30196* (2013.01); *G06T 2207/30241* (2013.01)

(58) Field of Classification Search
CPC ...... G06V 40/103; G06V 20/46; G06V 20/52; G06V 10/44; G06V 10/806; G06V 40/23; G06V 10/03; G06T 7/73; G06T 2207/30196; G06T 2207/30241
See application file for complete search history.

(56) References Cited

U.S. PATENT DOCUMENTS

| | | | |
|---|---|---|---|
| 10,488,910 B1 * | 11/2019 | Cannell | H04W 4/20 |
| 11,315,056 B2 * | 4/2022 | Almashor | G16H 40/20 |
| 2012/0154582 A1 | 6/2012 | Johnson et al. | |

(Continued)

FOREIGN PATENT DOCUMENTS

| | | |
|---|---|---|
| IN | 202041006858 A | 4/2020 |
| IN | 202011056603 A | 1/2021 |
| JP | 2017127593 A | 7/2017 |

OTHER PUBLICATIONS

Kennedy-Metz Lauren R et al: "Computer Vision in the Operating Room: Opportunities and Caveats", IEEE Transactions On Medical Robotics and Bionics, IEEE, vol. 3, No. 1, Nov. 24, 2020 (Nov. 24, 2020), pp. 2-10, XP011839591, DOI: 10.1109/TMRB.2020.3040002 [retrieved on Feb. 19, 2021].

(Continued)

*Primary Examiner* — Amara Abdi
(74) *Attorney, Agent, or Firm* — Trellis IP Law Group, PC

(57) ABSTRACT

Implementations generally recognize clinical activity using multiple cameras. In some implementations, a method includes obtaining a plurality of videos of a plurality of objects in an environment. The method further includes determining one or more key points for each object of the plurality of objects. The method further includes recognizing activity information based on the one or more key points. The method further includes computing workflow information based on the activity information.

20 Claims, 9 Drawing Sheets

(56) References Cited

U.S. PATENT DOCUMENTS

| | | | | |
|---|---|---|---|---|
| 2015/0123788 A1* | 5/2015 | Greenberg | ............. | G01S 3/781 |
| | | | | 340/539.13 |
| 2017/0273601 A1* | 9/2017 | Wang | .................... | A61B 5/1118 |
| 2018/0315200 A1* | 11/2018 | Davydov | ................ | G10L 15/26 |
| 2019/0090954 A1* | 3/2019 | Kotian | ................... | H04N 23/90 |
| 2020/0349347 A1 | 11/2020 | Morzhakov | | |
| 2021/0035437 A1 | 2/2021 | Zhang et al. | | |

OTHER PUBLICATIONS

Beddiar Djamila Romaissa et al: "Vision-based human activity recognition: a survey", Multimedia Tools and Applications, Kluwer Academic Publishers, Boston, US, vol. 79, No. 41-42, Aug. 15, 2020 (Aug. 15, 2020), pp. 30509-30555, XP037267392, ISSN: 1380-7501, DOI: 10.1007/SII042-020-09004-3 [retrieved on Aug. 15, 2020].

* cited by examiner

CLINICAL ACTIVITY RECOGNITION WITH MULTIPLE CAMERAS

CROSS REFERENCES TO RELATED APPLICATIONS

This application is related to the following U.S. Pat. No. 11,704,829, entitled POSE RECONSTRUCTION BY TRACKING FOR VIDEO ANALYSIS, issued on Jun. 18, 2023, which is hereby incorporated by reference as if set forth in full in this application for all purposes.

BACKGROUND

Some camera systems are able to capture videos of a person, analyze movements of the person, and generate an image or video dataset of metadata. To identify human actions captured by camera videos of the system, a person needs to manually view the videos. Manual monitoring and event reporting can be unreliable and time-consuming, especially where the positions and angles of the video cameras may vary and might not provide adequate coverage. Multiple cameras may be used in a controlled environment. However, subjects, movements, and background variation may still be substantially limited.

SUMMARY

Embodiments generally relate to recognizing clinical activity using multiple cameras. Embodiments described herein may be applied to the recognizing of human activities in clinical settings such as operation rooms, intensive care units (ICU), patient rooms, emergency rooms, etc.). Embodiments provide a context-aware system for providing better patient treatment and higher hospital efficiency.

In some embodiments, a system includes one or more processors, and includes logic encoded in one or more non-transitory computer-readable storage media for execution by the one or more processors. When executed, the logic is operable to cause the one or more processors to perform operations including: obtaining a plurality of videos of a plurality of objects in an environment; determining one or more key points for each object of the plurality of objects; recognizing activity information based on the one or more key points; and computing workflow information based on the activity information.

With further regard to the system, in some embodiments, the environment is an operating room. In some embodiments, the plurality of videos is captured by at least two video cameras. In some embodiments, the activity information includes pose information. In some embodiments, the logic when executed is further operable to cause the one or more processors to perform operations including: recognizing one or more objects that are people in the environment; tracking a trajectory of each person in the environment; and identifying one or more activities of each person. In some embodiments, the logic when executed is further operable to cause the one or more processors to perform operations including: recognizing one or more objects that are inanimate objects in the environment; tracking a position of each inanimate object that is recognized in the environment; and associating the one or more objects that are inanimate with each person. In some embodiments, the workflow information includes surgical workflow information.

In some embodiments, a non-transitory computer-readable storage medium with program instructions thereon is provided. When executed by one or more processors, the instructions are operable to cause the one or more processors to perform operations including: obtaining a plurality of videos of a plurality of objects in an environment; determining one or more key points for each object of the plurality of objects; recognizing activity information based on the one or more key points; and computing workflow information based on the activity information.

With further regard to the computer-readable storage medium, in some embodiments, the environment is an operating room. In some embodiments, the plurality of videos is captured by at least two video cameras. In some embodiments, the activity information includes pose information. In some embodiments, the instructions when executed are further operable to cause the one or more processors to perform operations including: recognizing one or more objects that are people in the environment; tracking a trajectory of each person in the environment; and identifying one or more activities of each person. In some embodiments, the instructions when executed are further operable to cause the one or more processors to perform operations including: recognizing one or more objects that are inanimate objects in the environment; tracking a position of each inanimate object that is recognized in the environment; and associating the one or more objects that are inanimate with each person. In some embodiments, the workflow information includes surgical workflow information.

In some embodiments, a method includes: obtaining a plurality of videos of a plurality of objects in an environment; determining one or more key points for each object of the plurality of objects; recognizing activity information based on the one or more key points; and computing workflow information based on the activity information.

With further regard to the method, in some embodiments, the environment is an operating room. In some embodiments, the plurality of videos is captured by at least two video cameras. In some embodiments, the activity information includes pose information. In some embodiments, the method further includes: recognizing one or more objects that are people in the environment; tracking a trajectory of each person in the environment; and identifying one or more activities of each person. In some embodiments, the method further includes: recognizing one or more objects that are inanimate objects in the environment; tracking a position of each inanimate object that is recognized in the environment; and associating the one or more objects that are inanimate with each person. In some embodiments, the workflow information includes surgical workflow information.

A further understanding of the nature and the advantages of particular implementations disclosed herein may be realized by reference of the remaining portions of the specification and the attached drawings.

DETAILED DESCRIPTION

Embodiments described herein enable, facilitate, and manage the recognizing and monitoring of clinical activity using multiple cameras. In some implementations, a system obtains a plurality of videos of a plurality of objects in an environment. The system determines one or more key points for each object of the plurality of objects. The system recognizes activity information based on the one or more key points. The system further computes workflow information based on the activity information.

Although embodiments disclosed herein are described in the context of objects or subjects being humans, these embodiments may also apply to other objects such as animals, mechanical devices, etc. that may perform various actions in an environment such as in a clinical environment.

Figure 1:
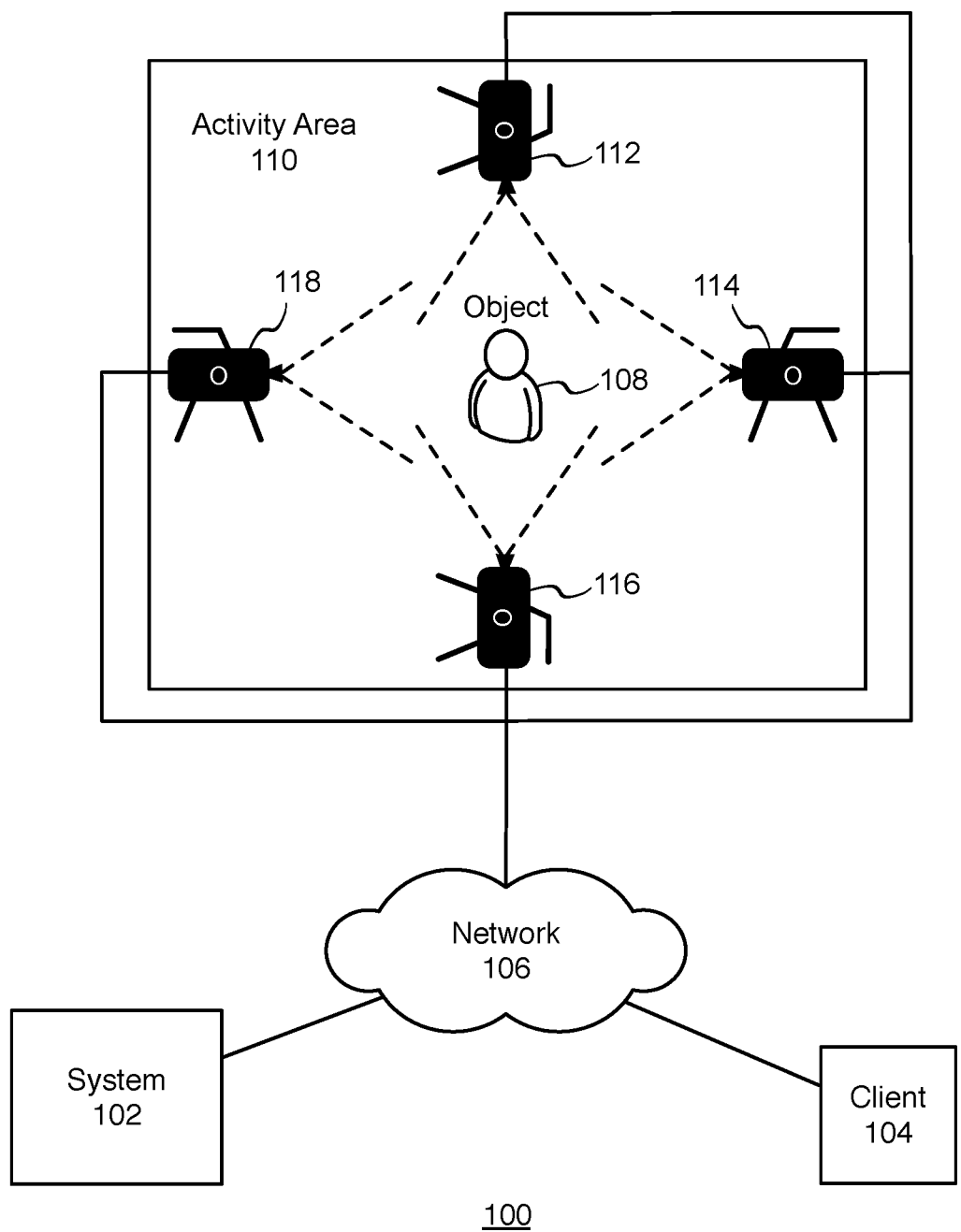
FIG. 1 is a block diagram of an example environment for recognizing clinical activity using multiple cameras, which may be used for implementations described herein.

FIG. 1 is a block diagram of an example environment 100 for recognizing clinical activity using multiple cameras, which may be used for implementations described herein. As described in more detail herein, system 102 is a context-aware system that provides better patient treatment and higher hospital efficiency. In some implementations, environment 100 includes a system 102, which communicates with a client 104 via a network 106. Network 106 may be any suitable communication network such as a Wi-Fi network, Bluetooth network, the Internet, etc.

In various embodiments, environment 100 may be any environment, where activity involving one or more people and/or one or more objects is recognized, monitored, and tracked. In various embodiments, environment 100 may be any clinical setting. For example, in some embodiments, environment 100 may be an operating room. In other embodiments, environment 100 may be an intensive care unit (ICU), a patient room, an emergency room, etc.

Activity area 110 may be the operating area of an operating room. In some embodiments, activity area 110 may be the entire operating room. In various embodiments, system 102, client 104, and network 106 may be local to the environment, remote (e.g., in the cloud), or combination thereof.

In various embodiments, the videos are captured by at least two video cameras. For example, as shown, system 102 monitors the activity of an object 108 in an activity area 110 using physical video cameras 112, 114, 116, and 118, which capture video of object 108 at different angles.

As described in more detail herein, in various embodiments, object 108 may represent one or more people. For example, in various scenarios, object 108 may represent one or more of clinicians such as a doctors and nurse, one or more assistants, a patient, etc. In various embodiments, object 108 may also represent one or more inanimate objects. For example, in various scenarios, object 108 may represent one or more hospital beds, surgery equipment, surgery tools, etc. Also, object 108 may represent multiple persons or multiple inanimate objects or a combination thereof. The particular type of object may vary and will depend on the particular implementation. In various embodiments, object 108 may also be referred to as a subject 108, a person 108, a target user 108, or any inanimate object 108.

In various embodiments, the system utilizes vision-based approaches, which are efficient in that there is no need for subjects to have any wearable equipment. Vision-based approaches are also highly scalable to different settings of the system. In various embodiments, the system automatically and accurately recognizes activity in a clinical environment (e.g., operating room, emergency room, etc.), which enables understanding of surgical or clinical workflow that is critical for optimizing clinical activities. The system performs real-time monitoring of staff and patient activities in an environment in order to enhance patient outcomes and care with reduced staff costs.

In various embodiments, physical video cameras 112, 114, 116, and 118 are positioned at various locations in order to capture multiple videos and/or still images from different points of view of the same object, including at different angles and/or at different distances. The terms cameras and video cameras may be used interchangeably. These different points of view make the appearance of different objects more distinguishable.

For ease of illustration, FIG. 1 shows one block for each of system 102, client 104, network 106, and activity area 110. Blocks 102, 104, 106, and 110 may represent multiple systems, client devices, networks, and activity areas. Also, there may be any number of people/subjects on a given activity area. For example, in some embodiments, subject 108 may represent one or more different subjects. In other implementations, environment 100 may not have all of the components shown and/or may have other elements including other types of elements instead of, or in addition to, those shown herein.

While system 102 performs embodiments described herein, in other embodiments, any suitable component or combination of components associated with system 102 or any suitable processor or processors associated with system 102 may facilitate performing the embodiments described herein.

Figure 2:
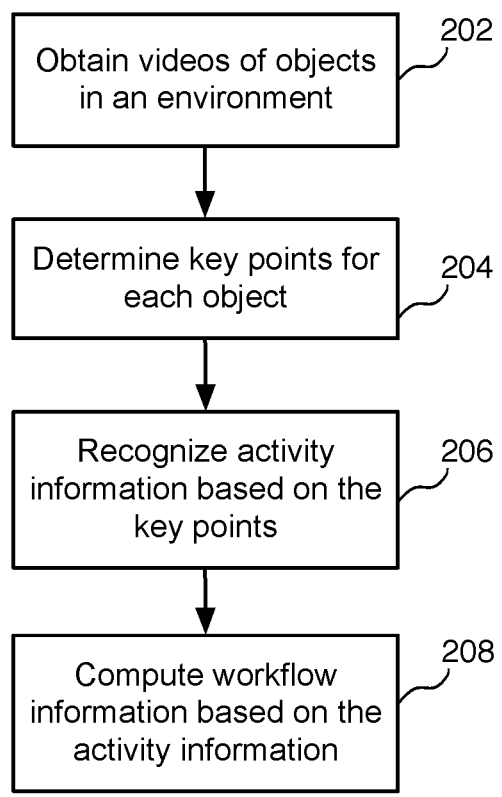
FIG. 2 is an example flow diagram for recognizing clinical activity using multiple cameras, according to some embodiments.

FIG. 2 is an example flow diagram for recognizing clinical activity using multiple cameras, according to some embodiments. Referring to both FIGS. 1 and 2, a method is initiated at block 202, where a system such as system 102 obtains multiple videos of multiple objects in an environment. In various embodiments, the cameras record the videos, and may store the videos in any suitable storage location. In various embodiments, video sequences are captured from multiple cameras, where the cameras may be configured with predetermined (including pre-calibrated) camera parameters. Such camera parameters may include one or more intrinsic matrices, one or more extrinsic matrices, etc.

At block 204, the system determines one or more key points for each object in the environment. In various embodiments, the system utilizes vision-based techniques using the multiple cameras, which is beneficial in that there is no need for any wearable equipment. Also, the system is highly scalable to different settings of the system.

In various embodiments, the system provides a skeleton-based approach for activity recognition, which is helpful to provide staff with good awareness of various situations during a surgery in order to improve efficiencies in clinical procedures. For example, in various embodiments, the system may use the key points in performing pose estimations. For example, if a staff member such as a doctor or nurse or other clinician escorts a patient into an operating room, the system identifies key points such as main body parts (e.g., head, torso, legs, arms, etc.), joints (e.g., neck, shoulders, elbows, wrists, knees, ankles, etc.), equipment, beds, etc.

In various embodiments, the system may utilize artificial intelligence (AI) technologies, deep machine learning technologies, and computer vision techniques to detect, identify, and recognize the key points from videos and may associate each key point to an object (e.g., head of a staff member, torso of a patient, etc.). The system utilizes these technologies to identify, categorize, measure, monitor, and track the movement and trajectories of the key points. As indicated herein, handcrafted features or wearable equipment are not needed. The use of multiple cameras makes the system more robust to change of environment. The use of multiple cameras also reduces any object occlusions of complex and crowded environments.

At block 206, the system recognizes activity information based on the one or more key points. In various embodiments, the activity information includes pose information. For example, the system may detect and recognize that a clinician is walking a patient to a bed. The system may then detect and recognize that the patient is lying down. The system may then detect and recognize that a person such as a staff member is pushing a bed on which a patient is lying. The system may detect if the person is moving a bed with a patient in the bed. As described in more detail herein, the system may detect when one or more people move in or out of a room and/or carry equipment and/or supplies into and around the room, etc.

In various embodiments, the system may utilize AI technologies, deep machine learning technologies, and computer vision techniques to recognize particular activity information such as movements associated with walking, carrying equipment, operating equipment, taking notes, etc. In various embodiments, the system may also utilize AI technologies, deep machine learning technologies, and computer vision techniques to associate the activity information with particular objects, including the body positions and movements of subjects. The system may utilize these and other techniques to distinguish between the different objects. As indicated herein, the system utilizes multiple cameras to capture video of the different objects in a given environment at different angles and distances relative to the objects.

Such recognition of activities enables understanding of surgical and/or other clinical workflows that are critical for optimizing hospital utilization. Real-time monitoring of activities in clinical settings enhances patient outcomes and care with reduced staff costs.

At block 208, the system computes workflow information based on the activity information. In various embodiments, the workflow information may include activity information of one or more objects (e.g., people, equipment, etc.) in an environment. For example, the workflow information may describe the beginning to the end of an operation, which may include when each person (e.g., clinician, patient, etc.) enters a room, preparation activities, operation activities, clean up activities, etc. The workflow information may also include a timeline and particular activities that occur during the timeline. Further example embodiments directed to workflow information are described in more detail herein, such as in connection with FIG. 7, for example.

As indicated herein, the system recognizes one or more objects that are people in the environment, and also identifies one or more activities of each person. In various embodiments, the system also tracks the trajectory of each person in the environment. For example, the system may detect specific movement including the trajectory of a person as the person walks into or out of a given room or space. The system may detect movement including the trajectory of a person as the person walks within a given environment (e.g., operating room, etc.). For example, the system may track the path that a staff member takes as the staff member moves a patient to a particular location and/or orientation in the given environment.

In various embodiments, the system recognizes one or more objects that are inanimate objects in the environment. The system tracks a position of each inanimate object that is recognized in the environment. For example, the system may detect a tray of surgical tools, a bed with a patient in the bed, various other equipment, etc., as well as their positions and orientation in an environment (e.g., operating room, etc.). The system also associates the one or more objects that are inanimate with each person. For example, if a given person (e.g., clinician, assistant, or other staff member, etc.) handles a particular inanimate object (e.g., tray of surgical tools, etc.). The system may then associate the inanimate object with a particular person (e.g., assistant).

In various embodiments, the workflow information includes surgical workflow information. For example, the system may generate a list of objects (e.g., one or more people, one or more inanimate objects that exist in an environment, enter or leave the environment, etc. The system may then determine actions associated with each object, as described herein. For example, the system may detect, recognize, and store information associated with a nurse escorting a patient into an operating room, the nurse assisting the patient in lying down, a doctor entering a room, a team of staff members preparing the patient and equipment for surgery, the doctor performing the surgery including various surgical procedures, post operation clean up, etc. These are examples, and the particular actions involved will vary depending on the particular implementation.

In various embodiments, the system also organizes the actions of the workflow chronologically and stores timing information (e.g., time stamps, etc.) associated with each action. The workflow information may include the list of objects detected, associations between various different objects, and a timeline of the different actions, etc. As such, the system determines the start and stop times of an overall procedure. The system also determines the start and stop times of phases within with the overall procedure. Such phases may include, for example, a set-up phase, an operation phase, a reporting phase, a clean up phase, etc.

In various embodiments, such workflow information is useful for staff members (e.g., administrators, doctors, nurses, etc.) to analyze the actions taken in the workflow. The system may determine if each action is proper or improper, normal or unusual, quick or time consuming, etc. The system may flag particular activities that appear to be improper, unusual, time consuming, etc.

In various embodiments, the system may generate a report that presents workflow information. The system may compute one or more recommendations based on the workflow information. The recommendations may be based on flags associated with particular activities as described herein. For example, the system may determine that a particular set-up procedure takes an unusually long time relative to other similar set-up procedures. The system may flag the action and/or the person associated with the action in the report. In various embodiments, a user or staff member may verify such determinations and/or modify the workflow for more efficiency and/or efficacy. Accordingly, embodiments described herein are beneficial in that generated workflow information may be used to improve timing of different procedures, catch complications, etc. Further example embodiments directed to a report are described in more detail herein such as in connection with FIG. 7, for example.

Figure 3:
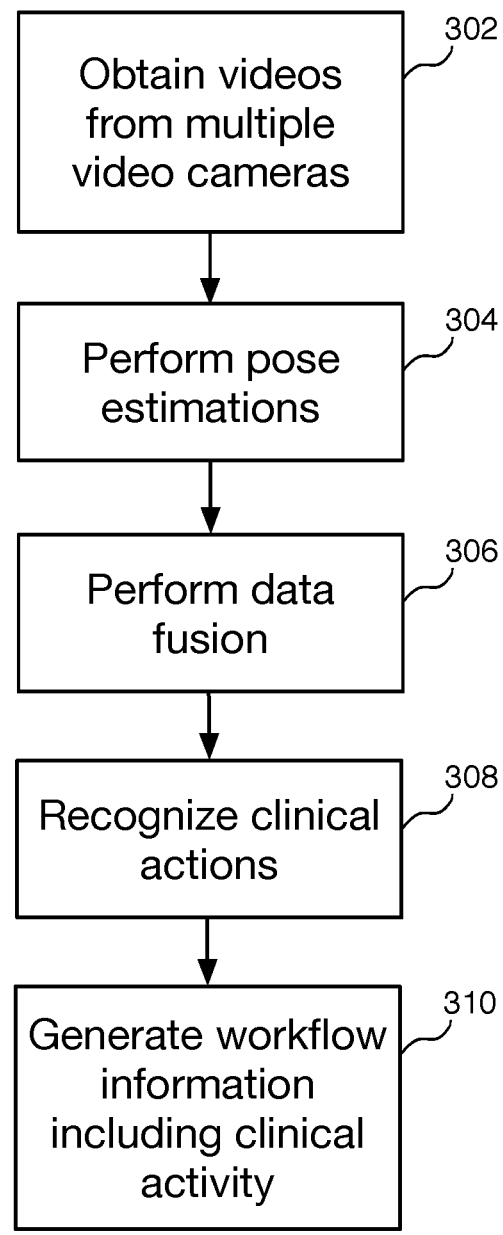
FIG. 3 is an example flow diagram for recognizing clinical activity using multiple cameras, according to some embodiments.

FIG. 3 is an example flow diagram for recognizing clinical activity using multiple cameras, according to some embodiments. Referring to both FIGS. 1 and 3, a method is initiated at block 302, where a system such as system 102 obtains videos from multiple video cameras. As indicated herein, the multiple cameras record the videos, and may store the videos in any suitable storage location. In various embodiments, video sequences are captured from multiple cameras, where the cameras may be configured with predetermined (including pre-calibrated) camera parameters. Such camera parameters may include one or more intrinsic matrices, one or more extrinsic matrices, etc.

At block 304, the system performs pose estimations. Such pose estimations may include pose information of one or more persons including staff and patients. Such pose estimations may be performed using any suitable multi-person pose estimator or key point detector (e.g., alpha pose estimator, high-resolution network, etc.).

At block 306, the system performs data fusion using the multiple cameras. Robust and accurate data fusion from multiple cameras may be processed in a complex and crowded environment. In various embodiments, data fusion is a process that associates or fuses the pose of a person from one camera to the pose of the same person from other cameras. After data fusion, the system reconstructs the 3D pose of all objects (e.g., staff, patient, etc.) in a virtual 3D space, given multiple 2D corresponding poses.

In various embodiments, the multiple cameras enable the system to handle objects involving self-occlusion and inter-object occlusion. For example, heavy self-occlusion and inter-object occlusion may result from other persons or large clinical equipment partially or fully blocking a given object from a given camera.

Multiple cameras simplify the monitoring task by providing more views of the objects being monitored. The use of multiple cameras provides distinguishable appearance information, enabling the system to recognize faces even if the faces are covered with masks and/or if staff and patients are wearing similar clothing.

At block 308, the system recognizes clinical actions. In various embodiments, the system may utilize a general skeleton-based activity classifier, which may include a graphics core next (GCN) techniques, recurrent neural network (RNN) techniques, etc.

At block 310, the system generates workflow information including clinical activity. In various embodiments, the workflow information may include trajectories of objects (e.g., staff, patient, inanimate objects, etc.) and activities of such objects (e.g., staff, patients, etc.). For example, in some embodiments, the system may identify and recognize one object (e.g., staff member, etc.) may escort another object (e.g., patient, etc.) to an operating room. Such information may be further used for many applications in the field of medical care, e.g., healthcare monitoring, operating room efficiency improvement, etc. As such, the system automatically recognizes staff, patients, and various objects in the environment, identifies their activities and movements, and monitors and tracks their trajectories.

Figure 4:
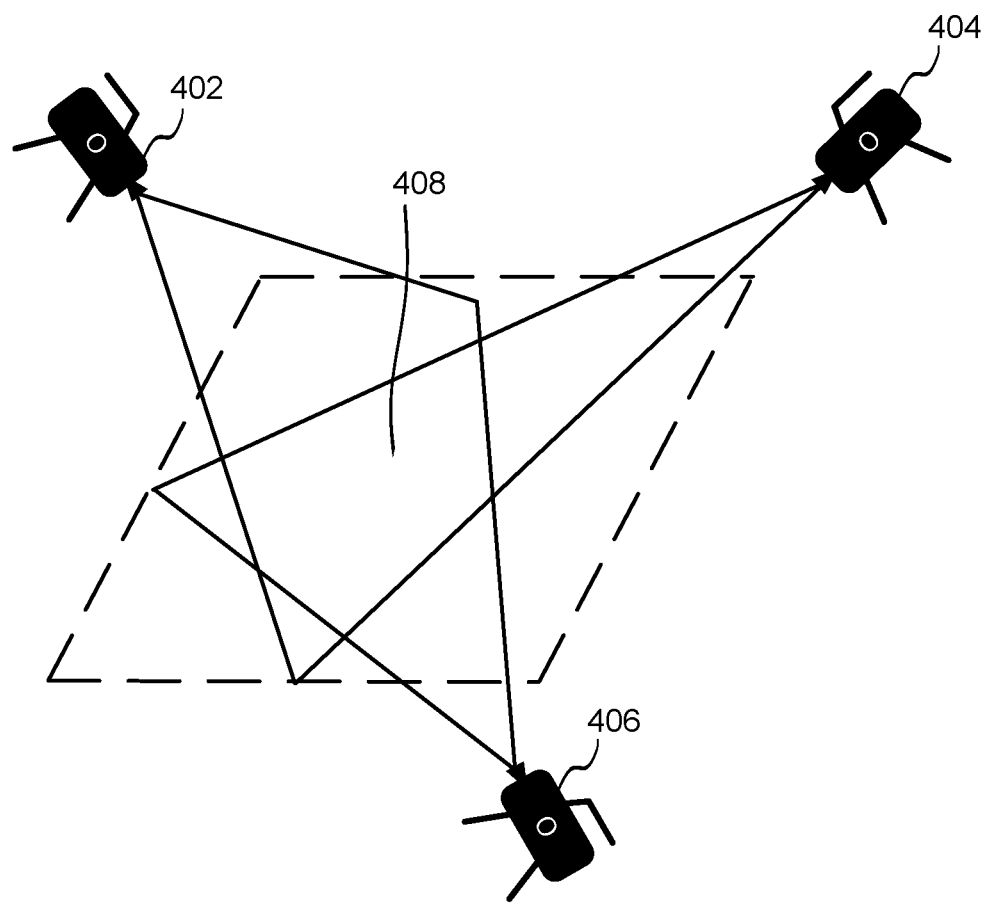
FIG. 4 is a block diagram of an example environment for recognizing clinical activity using multiple cameras and an overlap region, which may be used for implementations described herein.

FIG. 4 is a block diagram of an example environment 400 for recognizing clinical activity using multiple cameras and an overlap region, which may be used for implementations described herein. Environment 400 includes cameras 402, 404, and 406. In various embodiments, cameras 402-406 may be positioned at different locations.

In various embodiments, cameras 402-406 may be positioned at different locations such that their fields of view overlap. As shown, the fields of view of cameras 402, 404, and 406 overlap at overlap region 408. When a given object or objects (e.g., staff, patient, etc.) is positioned in overlap region 408, each of cameras 402, 404, and 406 is able to capture footage of the given object or objects.

In various embodiments, cameras 402-406 are set up pre-calibrated to avoid occlusion and to enable 3D reconstruction of objects in the environment. In various embodiments, the objects used for calibration are visible by all the cameras simultaneously. While 3 cameras are shown, there may be any number of cameras in environment 400. The particular number of cameras may depend on the particular environment. In various embodiments, the system uses cameras 402-406 to monitor objects such as tile on floor in order to calibrate patterns in the environment. Alternative camera calibration methods may be used including a commonly used checkerboard pattern or using red-green-blue-depth (RGB-D) cameras.

Figure 5A:
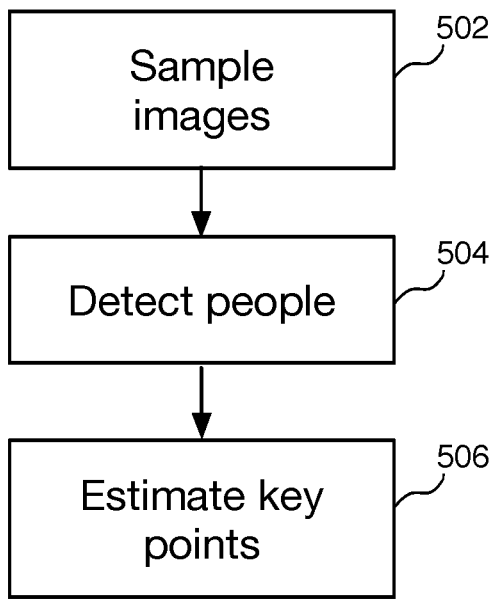
FIG. 5A is a flow diagram for recognizing clinical activity using a top-down approach, which may be used for implementations described herein.
Figure 5B:
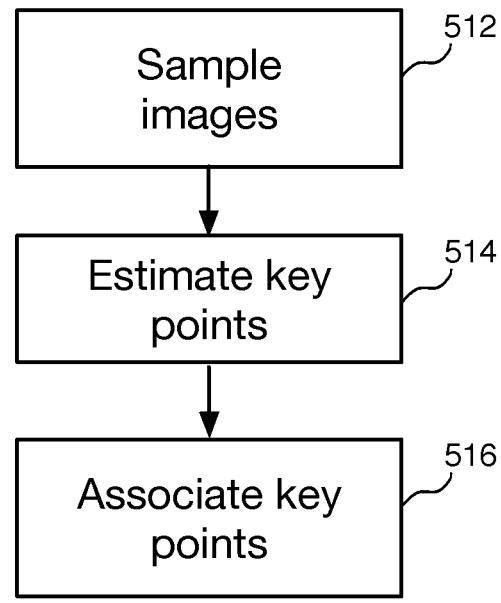
FIG. 5B is a flow diagram for recognizing clinical activity using a bottom-up approach, which may be used for implementations described herein.

FIGS. 5A and 5B are flow diagrams involving multiple-person two-dimensional (2D) pose estimation in a clinical environment. Embodiments described herein identify and localize the body joints of all persons in a given image to estimate multiple-person poses. As described below in connection with FIGS. 5A and 5B, embodiments may include a top-down approach and a bottom-up approach.

FIG. 5A is a flow diagram for recognizing clinical activity using a top-down approach, which may be used for implementations described herein. Referring to both FIGS. 1 and 5A, a method is initiated at block 502, where a system such as system 102 samples images.

At block 504, the system detects people. The system may detect staff (e.g., clinicians, assistants, etc.) and detect a patient by utilizing a general object detector.

At block 506, the system estimates key points. The system estimates key points such as the head, limbs, joints, etc. of each person with a key point detector.

FIG. 5B is a flow diagram for recognizing clinical activity using a bottom-up approach, which may be used for implementations described herein. Referring to both FIGS. 1 and 5B, a method is initiated at block 512, where a system such as system 102 samples images.

At block 514, the system estimates key points. As indicated herein, the system estimates key points such as the head, limbs, joints, etc. of each person with a key point detector.

At block 516, the system associates key points. For example, the system associates the key points with poses, where the system estimates 2D poses by connecting relevant key points.

In some embodiments, the system may achieve additional gains by tracking persons and key points in the image space, refining regions of interest, removing redundant pose(s) with non-maximum suppression, and enhancing key point detection by using enhanced heat map decoding.

Figure 6:
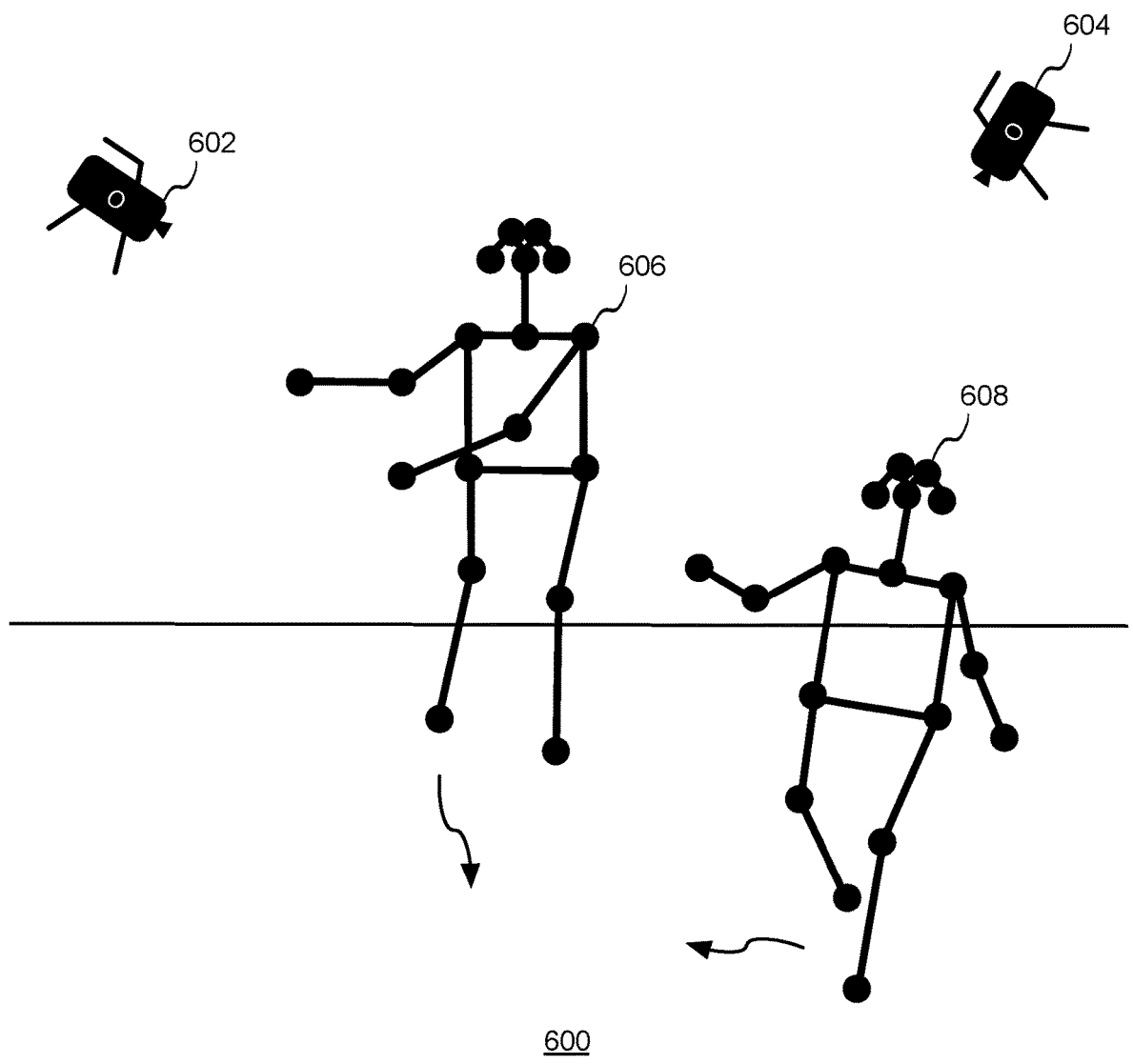
FIG. 6 is a block diagram of an example environment for recognizing clinical activity, which may be used for implementations described herein.

FIG. 6 is a block diagram of an example environment 600 for recognizing clinical activity, which may be used for implementations described herein. Shown are cameras 602 and 604, which capture video footage of objects or subjects 606 and 608. Objects 606 and 608 may be, for example, staff members in an operating room, or a staff member and a patient in the operating room, etc.

In various embodiments, the system performs data fusion and clinical action recognition, including skeleton-based activity recognition. As indicated above, in various embodiments, data fusion is a process that associates or fuses the pose of a person from one camera to the pose of the same person from other cameras. After data fusion, the system reconstructs the 3D pose of all objects (e.g., staff, patient, etc.) in a virtual 3D space, given multiple 2D corresponding poses.

The system recognizes the actions of each staff member and the patient based on their skeletal poses. Such actions may include standing, walking, crouching, sitting, etc. The system may utilize an action classifier to recognize such actions. The processes of the system is robust to visual noise such as background objects, irrelevant objects (e.g., clothing texture, etc.) compared with RGB images or depth maps. Alternative methods may include recognizing actions directly from images or depth maps. In some embodiments, the system may achieve additional gains by tracking poses in the reconstructed 3D space, and extracting skeleton features from both spatial and temporal space.

Figure 7:
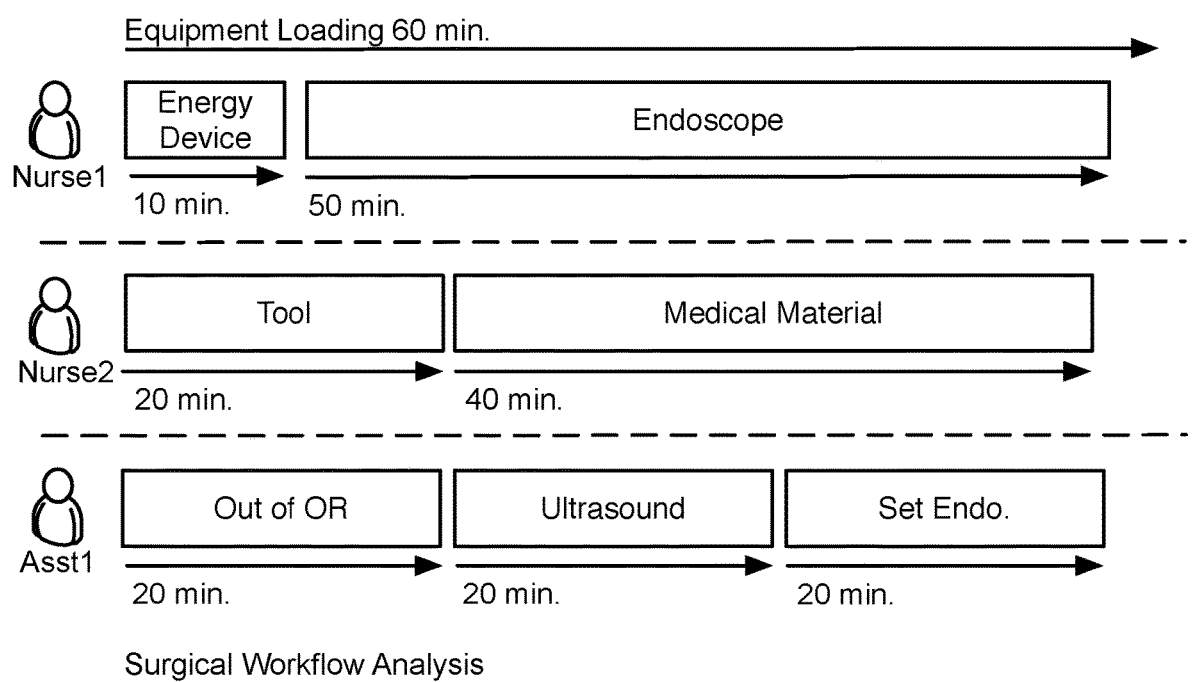
FIG. 7 is a block diagram of an example user interface used in recognizing clinical activity, which may be used for implementations described herein.

FIG. 7 is a block diagram of an example user interface 700 used in recognizing clinical activity, which may be used for implementations described herein. Workflow information associated with three objects or subjects is shown in a surgical workflow analysis. In this particular example embodiment, the workflow information is associated with two staff members (labeled Nurse1 and Nurse2) and an assistant (labeled Asst1). The number of objects or subjects may vary and will depend on the particular implementation. For example, there may be workflow information associated with a patient, clinical and/or surgical equipment, tools, and/or supplies, etc.

In this example embodiment, the surgical workflow analysis involves the loading of equipment. As shown, the loading of equipment took 60 minutes. For example, one staff member Nurse1 took 10 minutes to load an energy device and took 50 minutes to load an endoscope. Another staff member Nurse2 took 20 minutes to load a particular tool and took 40 minutes to load medical material. The assistant Asst1 took 20 minutes to move equipment out of an operating room (OR), took 20 minutes to load an ultrasound device, and took 20 minutes to set up an endoscope. While three objects or subjects Nurse1, Nurse2, and Asst1 are shown, there may be any number of objects shown in user interface 700.

In various embodiments, as indicated herein, the system recognizes, monitors, and tracks various objects including people and inanimate objects. The system identifies individual actions taken by each person. These actions may include movement such as the movement shown in FIG. 6. Actions may also include actions that each person takes involving inanimate objects such as clinical and/or surgical equipment, tools, and/or supplies, etc.

Embodiments described herein have various applications. Such applications may include, for example, analysis of trajectory information and activities of clinical staff and patients (e.g. walking, standing, etc.). Other applications may include intelligent surgical workflow analysis, robotic assisted surgery, operating room efficiency improvement and optimization, healthcare monitoring, patient safety enhancement, etc.

Embodiments described herein provide various benefits. For example, the system recognizes and analyzes human activities and actions in clinical settings (e.g. operation room, ICU, patient room, emergency room, etc.). This allows automatic monitoring for hospital operation, including efficiency understanding, analysis and optimization, as well as alerting abnormal behaviors. Embodiments also utilize a deep learning-based framework for multiple-person activity recognition with multiple cameras by leveraging people's pose skeletons, and without any wearable equipment or specific posture required by many existing motion capturing systems.

Figure 8:
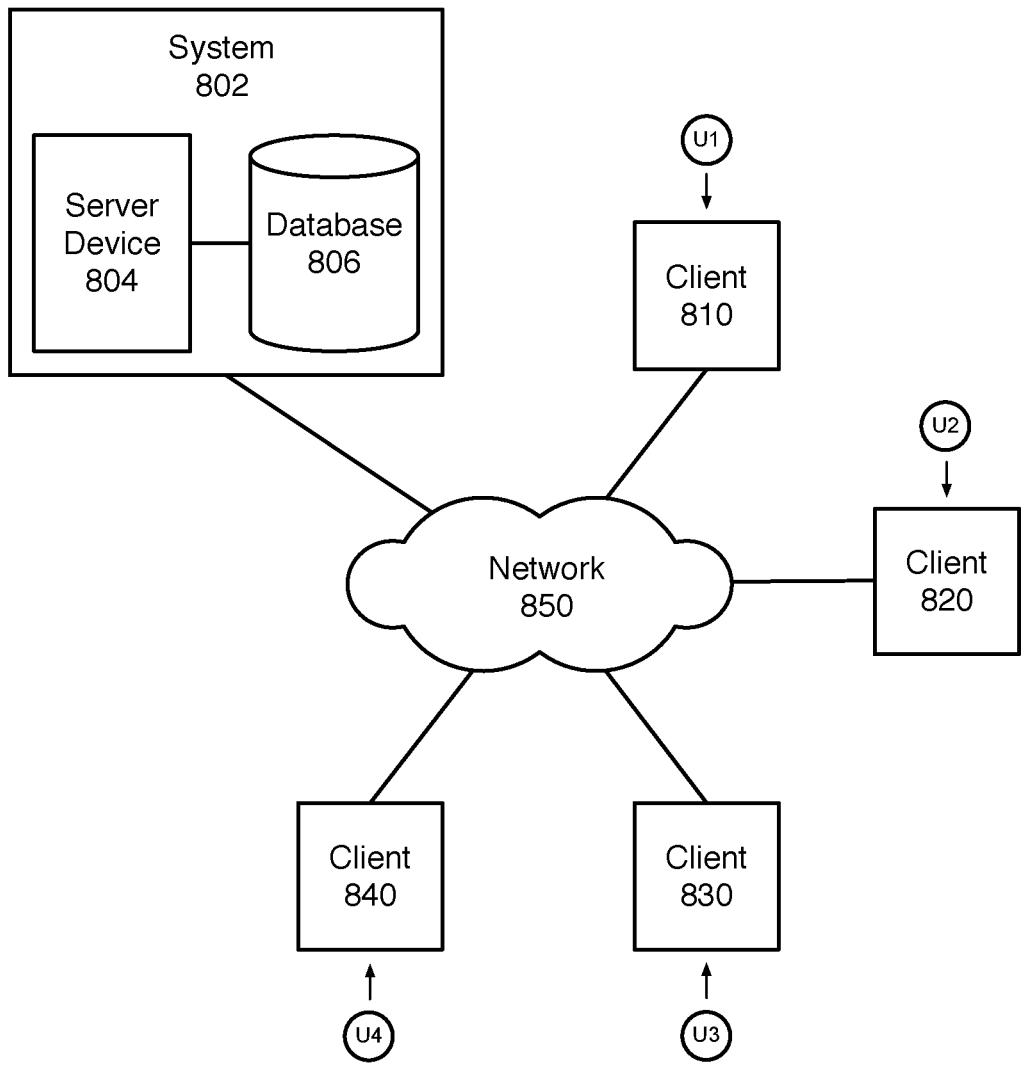
FIG. 8 is a block diagram of an example network environment, which may be used for some implementations described herein.

FIG. 8 is a block diagram of an example network environment 800, which may be used for some implementations described herein. In some implementations, network environment 800 includes a system 802, which includes a server device 804 and a database 806. For example, system 802 may be used to implement system 102 of FIG. 1, as well as to perform embodiments described herein. Network environment 800 also includes client devices 810, 820, 830, and 840, which may communicate with system 802 and/or may communicate with each other directly or via system 802. Network environment 800 also includes a network 850 through which system 802 and client devices 810, 820, 830, and 840 communicate. Network 850 may be any suitable communication network such as a Wi-Fi network, Bluetooth network, the Internet, etc.

For ease of illustration, FIG. 8 shows one block for each of system 802, server device 804, and network database 806, and shows four blocks for client devices 810, 820, 830, and 840. Blocks 802, 804, and 806 may represent multiple systems, server devices, and network databases. Also, there may be any number of client devices. In other implementations, environment 800 may not have all of the components shown and/or may have other elements including other types of elements instead of, or in addition to, those shown herein.

While server device 804 of system 802 performs embodiments described herein, in other embodiments, any suitable component or combination of components associated with system 802 or any suitable processor or processors associated with system 802 may facilitate performing the embodiments described herein.

In the various embodiments described herein, a processor of system 802 and/or a processor of any client device 810, 820, 830, and 840 cause the elements described herein (e.g., information, etc.) to be displayed in a user interface on one or more display screens.

Figure 9:
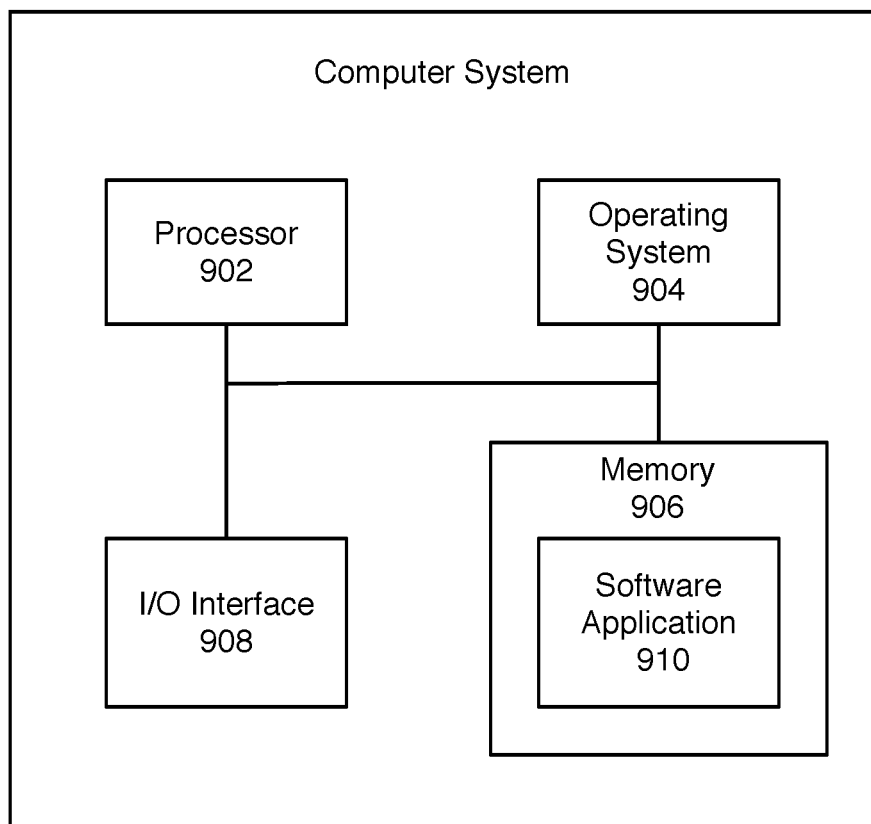
FIG. 9 is a block diagram of an example computer system, which may be used for some implementations described herein.

FIG. 9 is a block diagram of an example computer system 900, which may be used for some implementations described herein. For example, computer system 900 may be used to implement server device 804 of FIG. 8 and/or system 102 of FIG. 1, as well as to perform embodiments described herein. In some implementations, computer system 900 may include a processor 902, an operating system 904, a memory 906, and an input/output (I/O) interface 908. In various implementations, processor 902 may be used to implement various functions and features described herein, as well as to perform the method implementations described herein. While processor 902 is described as performing implementations described herein, any suitable component or combination of components of computer system 900 or any suitable processor or processors associated with computer system 900 or any suitable system may perform the steps described. Implementations described herein may be carried out on a user device, on a server, or a combination of both.

Computer system 900 also includes a software application 910, which may be stored on memory 906 or on any other suitable storage location or computer-readable medium. Software application 910 provides instructions that enable processor 902 to perform the implementations described herein and other functions. Software application may also include an engine such as a network engine for performing various functions associated with one or more networks and network communications. The components of computer system 900 may be implemented by one or more processors or any combination of hardware devices, as well as any combination of hardware, software, firmware, etc.

For ease of illustration, FIG. 9 shows one block for each of processor 902, operating system 904, memory 906, I/O interface 908, and software application 910. These blocks 902, 904, 906, 908, and 910 may represent multiple processors, operating systems, memories, I/O interfaces, and software applications. In various implementations, computer system 900 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   logic encoded in one or more non-transitory computer-readable storage media for execution by the one or more processors and when executed operable to cause the one or more processors to perform operations comprising:
   obtaining a plurality of videos of a plurality of objects in an environment;
   determining one or more key points for each object of the plurality of objects, wherein the plurality of objects comprises people, and wherein the one or more key points are associated with one or more body parts of each person of the people;
   recognizing the one or more objects of the plurality of objects that are inanimate objects in the environment;
   recognizing activity information based on the one or more key points of each person and of each object associated with each person;

identifying one or more activities of each person based on movements of each person and based on each inanimate object associated with each person;
identifying whether each person is a patient or a staff member;
determining whether a particular staff member has moved the patient from a first location to a second location based on one or more of AI technologies, deep machine learning technologies, and computer vision techniques that associate the activity information with particular inanimate objects, wherein the activity information comprises one or more of body positions and movements each person, and further based on the particular staff member moving an inanimate object that is associated with the patient from the first location to the second location; and
computing workflow information based on the activity information.

2. The system of claim 1, wherein the logic when executed is further operable to cause the one or more processors to perform operations comprising:
associating the one or more objects with at least one target activity of the one or more activities;
associating movements of each person with the at least one target activity; and
recognizing the at least one target activity based on the movements of each person.

3. The system of claim 1, wherein the plurality of videos is captured by at least two video cameras.

4. The system of claim 1, wherein the activity information comprises pose information.

5. The system of claim 1, wherein the logic when executed is further operable to cause the one or more processors to perform operations comprising:
recognizing one or more objects that are people in the environment;
tracking a trajectory of each person in the environment; and
identifying one or more activities of each person.

6. The system of claim 1, wherein the logic when executed is further operable to cause the one or more processors to perform operations comprising:
recognizing one or more objects that are inanimate objects in the environment;
tracking a position of each inanimate object of the inanimate objects that is recognized in the environment; and
associating the one or more objects that are inanimate with each person.

7. The system of claim 1, wherein the workflow information comprises surgical workflow information.

8. A non-transitory computer-readable storage medium with program instructions stored thereon, the program instructions when executed by one or more processors are operable to cause the one or more processors to perform operations comprising:
obtaining a plurality of videos of a plurality of objects in an environment;
determining one or more key points for each object of the plurality of objects, wherein the plurality of objects comprises people, and wherein the one or more key points are associated with one or more body parts of each person of the people;
recognizing the one or more objects of the plurality of objects that are inanimate objects in the environment;
recognizing activity information based on the one or more key points of each person and of each object associated with each person;
identifying one or more activities of each person based on movements of each person and based on each inanimate object associated with each person;
identifying whether each person is a patient or a staff member;
determining whether a particular staff member has moved the patient from a first location to a second location based on one or more AI technologies, deep machine learning technologies, and computer vision techniques that associate the activity information with particular inanimate objects, wherein the activity information comprises one or more body positions and movements each person, and further based on the particular staff member moving an inanimate object that is associated with the patient from the first location to the second location; and
computing workflow information based on the activity information.

9. The computer-readable storage medium of claim 8, wherein the environment is an operating room.

10. The computer-readable storage medium of claim 8, wherein the plurality of videos is captured by at least two video cameras.

11. The computer-readable storage medium of claim 8, wherein the activity information comprises pose information.

12. The computer-readable storage medium of claim 8, wherein the instructions when executed are further operable to cause the one or more processors to perform operations comprising:
recognizing one or more objects that are people in the environment;
tracking a trajectory of each person in the environment; and
identifying one or more activities of each person.

13. The computer-readable storage medium of claim 8, wherein the instructions when executed are further operable to cause the one or more processors to perform operations comprising:
recognizing one or more objects that are inanimate objects in the environment;
tracking a position of each inanimate object of the inanimate objects that is recognized in the environment; and
associating the one or more objects that are inanimate with each person.

14. The computer-readable storage medium of claim 8, wherein the workflow information comprises surgical workflow information.

15. A computer-implemented method comprising:
obtaining a plurality of videos of a plurality of objects in an environment;
determining one or more key points for each object of the plurality of objects, wherein the plurality of objects comprises people, and wherein the one or more key points are associated with one or more body parts of each person of the people;
recognizing the one or more objects of the plurality of objects that are inanimate objects in the environment;
recognizing activity information based on the one or more key points of each person and of each object associated with each person;
identifying one or more activities of each person based on movements of each person and based on each inanimate object associated with each person;
identifying whether each person is a patient or a staff member;

determining whether a particular staff member has moved the patient from a first location to a second location based on one or more of AI technologies, deep machine learning technologies, and computer vision techniques that associate the activity information with particular inanimate objects, wherein the activity information comprises one or more of body positions and movements each person, and further based on the particular staff member moving an inanimate object that is associated with the patient from the first location to the second location; and computing workflow information based on the activity information.

16. The method of claim 15, wherein the environment is an operating room.

17. The method of claim 15, wherein the plurality of videos is captured by at least two video cameras.

18. The method of claim 15, wherein the activity information comprises pose information.

19. The method of claim 15, further comprising:
recognizing one or more objects that are people in the environment;
tracking a trajectory of each person in the environment; and
identifying one or more activities of each person.

20. The method of claim 15, further comprising:
recognizing one or more objects that are inanimate objects in the environment;
tracking a position of each inanimate object of the inanimate objects that is recognized in the environment; and
associating the one or more objects that are inanimate with each person.

* * * * *